(12) United States Patent
Anderson et al.

(10) Patent No.: US 11,677,691 B2
(45) Date of Patent: Jun. 13, 2023

(54) COMPUTER-BASED TECHNIQUES FOR OBTAINING PERSONALIZED ASSISTANCE WITH SOFTWARE APPLICATIONS

(71) Applicant: AUTODESK, INC., San Francisco, CA (US)

(72) Inventors: Fraser Anderson, Camrose (CA); George Fitzmaurice, Toronto (CA); Tovi Grossman, Toronto (CA); Nikhita Joshi, Saint John (CA); Justin Frank Matejka, Newmarket (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 17/193,734

(22) Filed: Mar. 5, 2021

(65) Prior Publication Data

US 2021/0306286 A1    Sep. 30, 2021

Related U.S. Application Data

(60) Provisional application No. 63/000,684, filed on Mar. 27, 2020.

(51) Int. Cl.
*H04L 51/02* (2022.01)
*H04N 7/14* (2006.01)
(Continued)

(52) U.S. Cl.
CPC ............ *H04L 51/02* (2013.01); *G06F 3/1454* (2013.01); *H04L 51/216* (2022.05);
(Continued)

(58) Field of Classification Search
CPC combination set(s) only.
See application file for complete search history.

(56) References Cited

U.S. PATENT DOCUMENTS

| 6,389,400 B1* | 5/2002 | Bushey | G06Q 30/02 |
| | | | 705/7.29 |
| 2014/0092202 A1* | 4/2014 | Bentley | H04L 65/403 |
| | | | 348/E7.083 |

(Continued)

OTHER PUBLICATIONS

Ackerman et al., "Answer Garden: A Tool for Growing Organizational Memory", Proceedings of the conference on Office information systems—, ACM Press, http://doi.org/10.1145/91474.91485, 1990, pp. 31-39.

(Continued)

*Primary Examiner* — Phung-Hoang J Nguyen
(74) *Attorney, Agent, or Firm* — Artegis Law Group, LLP

(57) ABSTRACT

In various embodiments, a mentor application automatically obtains assistance with software applications. The mentor application generates a computer-generated help request associated with a first user of a software application. Based on the computer-generated help request and a set of user contexts associated with a set of users, the mentor application computes match scores. Each match score predicts how suitable a particular user is for servicing the computer-generated help request. Based on the match scores, the mentor application transmits at least one help request notification to at least one user included in the set of users to determine a second user to service the computer-generated help request. The mentor application then establishes a computer connection between the first user and the second user through which an interactive help session between the first user and the second user is held.

20 Claims, 6 Drawing Sheets

(51) Int. Cl.

| | |
|---|---|
| *H04N 7/15* | (2006.01) |
| *H04M 3/42* | (2006.01) |
| *H04M 3/51* | (2006.01) |
| *H04M 3/523* | (2006.01) |
| *H04M 3/56* | (2006.01) |
| *G06F 3/14* | (2006.01) |
| *H04L 51/216* | (2022.01) |

(52) U.S. Cl.
CPC ..... *H04M 3/42221* (2013.01); *H04M 3/5191* (2013.01); *H04M 3/5233* (2013.01); *H04M 3/563* (2013.01); *H04N 7/147* (2013.01); *H04N 7/155* (2013.01); *H04M 2201/40* (2013.01)

(56) References Cited

U.S. PATENT DOCUMENTS

| | | | | |
|---|---|---|---|---|
| 2016/0021250 | A1* | 1/2016 | Kumar | H04M 3/5166 379/88.01 |
| 2016/0163333 | A1* | 6/2016 | Totzke | G10L 25/63 704/235 |
| 2020/0302013 | A1* | 9/2020 | Stegmaier | G06F 40/18 |
| 2022/0027832 | A1* | 1/2022 | Bao | G06Q 10/0639 |

OTHER PUBLICATIONS

Ackerman et al., "Answer Garden 2: Merging Organizational Memory with Collaborative Help", Proceedings of the 1996 ACM conference on Computer supported cooperative work-CSCW '96, ACM Press, http://doi.org/10.1145/240080.240203, 1996, pp. 97-105.

Ames, Andrea L., "Just What They Need, Just When They Need It: An Introduction to Embedded Assistance", Proceedings of the 19th annual international conference on Computer documentation—SIGDOC'01, ACM Press, http://doi.org/10.1145/501516.501539, Oct. 21-24, 2001, pp. 111-115.

Asaduzzaman et al., "Answering Questions about Unanswered Questions of Stack Overflow", 10th Working Conference on Mining Software Repositories (MSR), IEEE, http://doi.org/10.1109/MSR.2013.6624015, 2013, pp. 97-100.

Berlin et al., "Consultants and Apprentices: Observations about Learning and Collaborative Problem Solving", Proceedings of the 1992 ACM conference on Computer-supported cooperative work—CSCW '92, ACM Press, http://doi.org/10.1145/143457.143471, 1992, pp. 130-137.

Camerer et al., "Recent Developments in Modeling Preferences:Uncertainty and Ambiguity", Journal of Risk and Uncertainty, vol. 5, No. 4, http://doi.org/10.1007/BF00122575, 1992, pp. 325-370.

Carroll et al., "Paradox of the Active User", In Interfacing Thought: Cognitive Aspects of Human-Computer Interaction, MIT Press, Cambridge, MA, USA, 1987, pp. 80-111.

Chen et al., "Codeon: On-Demand Software Development Assistance", Proceedings of the 2017 CHI Conference on Human Factors in Computing Systems—CHI '17, ACM Press, http://doi.org/10.1145/3025453.3025972, May 6-11, 2017, pp. 6220-6231.

Chen et al., "Towards Providing On-Demand Expert Support for Software Developers", Proceedings of the 2016 CHI Conference on Human Factors in Computing Systems-CHI '16, ACM Press, http://doi.org/10.1145/2858036.2858512, May 7-12, 2016, pp. 3192-3203.

Chilana et al., "Modern Software Product Support Processes and the Usage of Multimedia Formats", Proceedings of the 2011 annual conference on Human factors in computing systems—CHI '11, ACM Press, http://doi.org/10.1145/1978942.1979400, May 7-12, 2011, pp. 3093-3102.

Chilana et al., "Supporting Remote Real-Time Expert Help:Opportunities and Challenges for Novice 3D Modelers", 2018 IEEE Symposium on Visual Languages and Human-Centric Computing (VL/HCC), IEEE, http://doi.org/10.1109/VLHCC.2018.8506568, 2018, pp. 157-166.

Chilana et al., "LemonAid: Selection-Based Crowdsourced Contextual Help for Web Applications", Proceedings of the 2012 ACM annual conference on Human Factors in Computing Systems—CHI '12, ACM Press, http://doi.org/10.1145/2207676.2208620, May 5-10, 2012, pp. 1549-1558.

Codementor, "Codementor | Get live 1:1 coding help, hire a developer, & more", Retrieved Sep. 1, 2021, from https://www.codementor.io, 2021, 9 pages.

Ellsberg, Daniel, "Risk, Ambiguity, and the Savage Axioms", The Quarterly Journal of Economics, vol. 75, No. 4, http://doi.org/10.2307/1884324, Nov. 1961, pp. 643-669.

Furnas et al., "The Vocabulary Problem in Human-System Communication", Communications of the ACM, vol. 30, No. 11, http://doi.org/10.1145/32206.32212, Nov. 1987, pp. 964-971.

Fussell et al., "Coordination of Communication: Effects of Shared Visual Context on Collaborative Work", Proceedings of the 2000 ACM conference on Computer supported cooperative work—CSCW '00, ACM Press, http://doi.org/10.1145/358916.358947, Dec. 2-6, 2000, pp. 21-30.

Goldman et al., "RealTime Collaborative Coding in a Web IDE", Proceedings of the 24th annual ACM symposium on User interface software and technology—UIST '11, ACM Press, http://doi.org/10.1145/2047196.2047215, Oct. 16-19, 2011, pp. 155-164.

Grossman et al., "ToolClips: An Investigation of Contextual Video Assistance for Functionality Understanding", Proceedings of the 28th international conference on Human factors in computing systems—CHI '10, ACM Press, http://doi.org/10.1145/1753326.1753552, Apr. 10-15, 2010, pp. 1515-1524.

Grossman et al., "A Survey of Software Learnability:Metrics, Methodologies and Guidelines", Proceedings of the 27th international conference on Human factors in computing systems—CHI 09, ACM Press, http://doi.org/10.1145/1518701.1518803, Apr. 7, 2019, pp. 649-658.

Guo et al., "Codechella: Multi-User Program Visualizations for Real-Time Tutoring and Collaborative Learning", 2015 IEEE Symposium on Visual Languages and Human-Centric Computing (VL/HCC), IEEE, http://doi.org/10.1109/VLHCC.2015.7357201, 2015, pp. 79-87.

Harrison, Susan M., "A Comparison of Still, Animated, or Nonillustrated On-Line Help with Written or Spoken Instructions in a Graphical User Interface", Proceedings of the SIGCHI conference on Human factors in computing systems—CHI '95, ACM Press, http://doi.org/10.1145/223904.223915, May 7-11, 1995, pp. 82-89.

Holland, Arienne, "How Estimated Reading Times Increase Engagement With Content", Marketing Land, Retrieved Sep. 1, 2021 from https://martech.org/estimated-reading-times-increase-engagement/, Apr. 14, 2014, 12 pages.

Horowitz et al., "The Anatomy of a Large-Scale Social Search Engine", Proceedings of the 19th international conference on World wide web—WWW '10, ACM Press, http://doi.org/10.1145/1772690.1772735, Apr. 26-30, 2010, pp. 431-440.

Hudson et al., "Understanding Newcomers to 3D Printing:Motivations, Workflows, and Barriers of Casual Makers", Proceedings of the 2016 CHI Conference on Human Factors in Computing Systems—CHI '16, ACM Press, http://doi.org/10.1145/2858036.2858266, May 7-12, 2016, pp. 384-396.

Hudson et al., "Understanding Triggers for Clarification Requests in Community-Based Software Help Forums", 2015 IEEE Symposium on Visual Languages and Human-Centric Computing (VL/HCC), IEEE, http://doi.org/10.1109/VLHCC.2015.7357216, 2015, pp. 189-193.

Jacobs, Aaron, "accessibility: Extension module that wraps the Accessibility API for Mac Os X", Retrieved Sep. 1, 2021 from https://github.com/atheriel/accessibility, 2021, 2 pages.

Java et al., "Why We Twitter: Understanding Microblogging Usage and Communities", Proceedings of the 9th WebKDD and 1st SNA-KDD 2007 workshop on Web mining and social network analysis-WebKDD/SNA-KDD '07, ACM Press, http://doi.org/10.1145/1348549.1348556, Aug. 12, 2007, pp. 56-65.

(56) References Cited

OTHER PUBLICATIONS

Kiani et al., "Beyond "One-Size-Fits-All": Understanding the Diversity in How Software Newcomers Discover and Make Use of Help Resources", Proceedings of the 2019 CHI Conference on Human Factors in Computing Systems—CHI '19, ACM Press, http://doi.org/10.1145/3290605.3300570, May 4-9, 2019, pp. 1-14.

Knabe, Kevin, "Apple Guide: A Case Study in User-Aided Design of Online Help", Conference companion on Human factors in computing systems—CHI '95, ACM Press, http://doi.org/10.1145/223355.223677, May 7-11, 1995, pp. 286-287.

Konnikova, Maria, "A List of Reasons Why Our Brains Love Lists", Retrieved Sep. 1, 2021 from https://www.newyorker.com/tech/elements/a-list-ofreasons-why-our-brains-love-lists, Dec. 2, 2013, 4 pages.

Mackay, Wendy E., "Patterns of Sharing Customizable Software", Proceedings of the 1990 ACM conference on Computer-supported cooperative work—CSCW '90, ACM Press, http://doi.org/10.1145/99332.99356, Oct. 1990, pp. 209-221.

Matejka et al., "IP-QAT: In-Product Questions, Answers & Tips", Proceedings of the 24th annual ACM symposium on User interface software and technology—UIST '11, ACM Press, http://doi.org/10.1145/2047196.2047218, Oct. 16-19, 2011, pp. 175-184.

Matejka et al., "Ambient Help", Proceedings of the 2011 annual conference on Human factors in computing systems—CHI '11, ACM Press, http://doi.org/10.1145/1978942.1979349, May 7-12, 2011, pp. 2751-2760.

Matejka et al., "CommunityCommands:Command Recommendations for Software Applications", Proceedings of the 22nd annual ACM symposium on User interface software and technology—UIST '09, ACM Press, http://doi.org/10.1145/1622176.1622214, Oct. 4-7, 2009, pp. 193-202.

McDonald et al., "Expertise Recommender: A Flexible Recommendation System and Architecture", Proceedings of the 2000 ACM conference on Computer supported cooperative work—CSCW '00, ACM Press, http://doi.org/10.1145/358916.358994, Dec. 2-6, 2000, pp. 231-240.

Medium, "Read Time and You", Here's how read time is calculated, Retrieved Aug. 31, 2021 from https://blog.medium.com/read-time-and-youbc2048ab620c, Jun. 4, 2014, 2 pages.

Novick et al., "Toward a More Accurate View of When and How People Seek Help with Computer Applications", Proceedings of the 25th annual ACM international conference on Design of communication—SIGDOC'07, ACM Press, http://doi.org/10.1145/1297144.1297165, Oct. 22-24, 2007, pp. 95-102.

Palmiter et al., "An Evaluation of Animated Demonstrations for Learning Computer-based Tasks", Proceedings of the SIGCHI conference on Human factors in computing systems Reaching through technology—CHI '91, ACM Press, http://doi.org/10.1145/108844.108906, 1991, pp. 257-263.

Riahi et al., "Finding Expert Users in Community Question Answering", Proceedings of the 21st international conference companion on World Wide Web—WWW '12 Companion, ACM Press, http://doi.org/10.1145/2187980.2188202, Apr. 16-20, 2012, pp. 791-798.

Twidale, Michael B., "Over the Shoulder Learning: Supporting Brief Informal Learning", Computer Supported Cooperative Work (CSCW), vol. 14, No. 6, http://doi.org/10.1007/s10606-005-9007-7, 2005, pp. 505-547.

Wilner, Christina, "5 surprising Benefits of using Time Estimates in your To-do List", Amazing Marvin, Retrieved Aug. 31, 2021 from https://blog.amazingmarvin.com/5-benefits-of-usingtime-estimates-in-your-to-do-list/, 2019, 16 pages.

Stack Overflow, "How do I ask a good question?", Help Center, Retrieved Aug. 31, 2021 from https://stackoverflow.com/help/how-to-ask, 2021, 3 pages.

Twitter, "Rogue ?. Bigham on Twitter: @deliprao haha, tweets are way better. first, you did the tiniest amount (at least) of background on me. second, they're short! easier to read, and incentivizes getting to the point, third, my response is expected to be short, so need to ask something that gets to the heart of it!" / Twitter, Retrieved Aug. 31, 2021 from https://twitter.com/jeffbigham/status/1165383660666859520, Aug. 25, 2019, 2 pages.

Nielsen, Jakob, "Powers of 10: Time Scales in User Experience", Nielsen Norman Group, Retrieved Aug. 31, 2021 from https://www.nngroup.com/articles/powers-of-10-timescales-in-ux/, Oct. 4, 2009, 8 pages.

\* cited by examiner

COMPUTER-BASED TECHNIQUES FOR OBTAINING PERSONALIZED ASSISTANCE WITH SOFTWARE APPLICATIONS

CROSS-REFERENCE TO RELATED APPLICATIONS

This application claims priority benefit of the United States Provisional patent application titled, "Computer-Based Techniques for Assisting Users with Software Applications," filed on Mar. 27, 2020 and having Ser. No. 63/000,684. The subject matter of this related application is hereby incorporated herein by reference.

BACKGROUND

Field of the Various Embodiments

The various embodiments relate generally to computer science and server-hosted software and, more specifically, to computer-based techniques for obtaining personalized assistance with software applications.

DESCRIPTION OF THE RELATED ART

Many industries make extensive use of software applications that offer large feature sets associated with hundreds or even thousands of commands executed via complex graphical user interfaces ("GUIs"). Because of the large number of options, learning to use these types of "feature-rich" software applications in unfamiliar ways can be quite daunting. While generalized assistance can oftentimes be obtained via software product documentation, training classes, and other types of formal training, obtaining personalized guidance when struggling to accomplish a specific task or troubleshooting an unexpected outcome can be far more challenging.

Some approaches to obtaining personalized guidance when using a software application are more human-based and involve asking another user for one-on-one help directly or seeking help via a centralized help organization, like a "help desk." One drawback of these approaches is the difficulty in identifying someone who can provide effective personalized guidance to a particular software user. For example, with respect to asking for one-on-one help, oftentimes the people a particular software user knows do not know the answers to the specific questions being asked by that user. In the context of centralized help organizations, the person asked to respond to a given help request is oftentimes identified randomly or is identified based on overall skill level with respect to the software application at-issue. With feature-rich software applications, though, different people can have different levels of experience using the various features of a software application. For example, an "expert" user of a software application could have little or no experience using a relatively new or obscure feature of that software application. Further, some help requests involve domain-specific knowledge that is not typically reflected in the skill levels of the persons working within a centralized help organization. For a given help request, if the person identified to respond to the help request lacks the experience with the associated features or the requisite domain-specific knowledge necessary to properly service the help request, then the likelihood of providing effective help and guidance to the software user is substantially reduced.

Other approaches to obtaining personalized guidance when using a software application are more machine-centric and involve automatically pairing a current software user with one or more other users who can help the current user with his/her specific question(s). However, conventional software is not configured to automatically account for the different experience levels that different users of a given software application may have with respect to specific features of the software applications or the different levels of domain-specific knowledge that different users of a given software application may have. Consequently, the likelihood of automatically identifying a user who has the specific experience or domain-specific knowledge to effectively respond to a given help request is substantially reduced.

As the foregoing illustrates, what is needed in the art are more effective techniques for obtaining personalized assistance with software applications.

SUMMARY

One embodiment of the present invention sets forth a computer-implemented method for automatically obtaining assistance with software applications, The method includes generating a first computer-generated help request associated with a first user of a first software application; computing a first set of match scores based on the first computer-generated help request and a set of user contexts associated with a set of users, where each match score included in the first set of match scores predicts how suitable a particular user is for servicing the first computer-generated help request; based on the first set of match scores, transmitting at least one help request notification to at least one user included in the set of users to determine a second user to service the first computer-generated help request; and establishing a computer connection between the first user and the second user through which an interactive help session between the first user and the second user is held.

At least one technical advantage of the disclosed techniques relative to the prior art is that the disclosed techniques can be incorporated into a software application to enable the software application to automatically predict, based on contextual information, how suitable different users are for servicing a given help request for either that software application or an associated software application. Accordingly, with the disclosed techniques, the software application can automatically transmit help request notifications to users in descending order according to suitability for servicing the help request. This functionality, which is not available in conventional software applications, can increase the likelihood that a given help request is serviced by a user having the specific experience or domain-specific knowledge to effectively respond to the help request. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
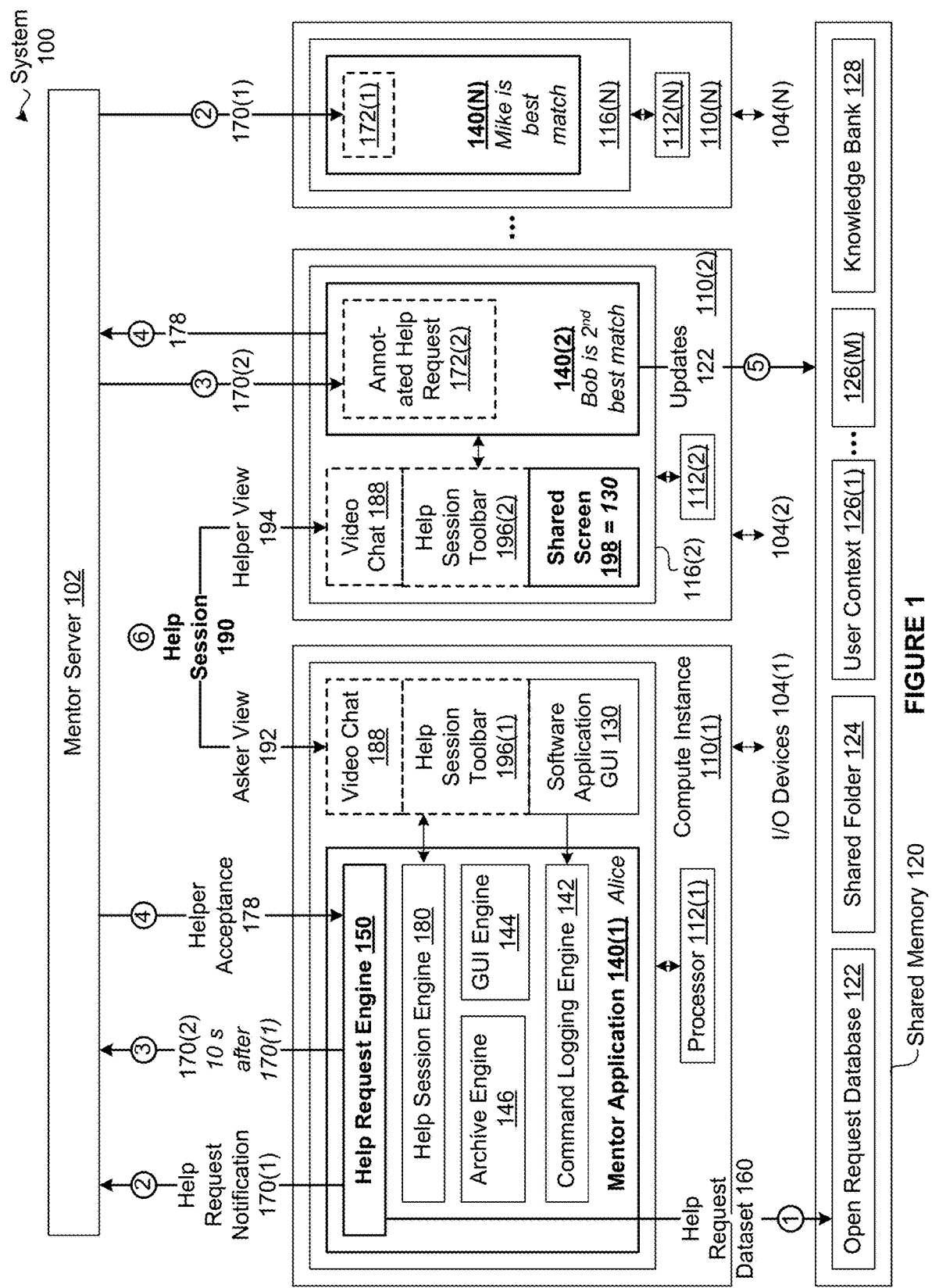
FIG. 1 is a conceptual illustration of a system configured to implement one or more aspects of the various embodiments.

FIG. 1 is a conceptual illustration of a system 100 configured to implement one or more aspects of the various embodiments. As shown, the system 100 includes, without limitation, compute instances 110(1)-110(N), where N can be any integer greater than one, a mentor server 102, and shared memory 120. For explanatory purposes, multiple instances of like objects are denoted with reference numbers identifying the object and parenthetical alphanumeric character(s) identifying the instance where needed.

Any number of the components of the system 100 can be distributed across multiple geographic locations or implemented in one or more cloud computing environments (i.e., encapsulated shared resources, software, data, etc.) in any combination. For explanatory purposes only, the compute instances 110(1)-110(N) are also referred to herein individually as "the compute instance 110" and collectively as "the compute instances 110." In some embodiments, each of the compute instances 110 can be implemented in a cloud computing environment, implemented as part of any other distributed computing environment, or implemented in a stand-alone fashion.

As shown, in some embodiments, the compute instance 110(1) includes, without limitation, a processor 112(1) and a memory 116(1), the compute instance 110(2) includes, without limitation, a processor 112(2) and a memory 116(2), and the computer instance 110(N) includes, without limitation, a processor 112(N) and a memory 116(N). Although not shown, in some embodiments, the computer instances 110(3)-110(N-1) include, without limitation, processors 112(3)-112(N-1), respectively, and memories 116(3)-110(N-1), respectively. The processors 112(1)-112(N) are also referred to herein individually as "the processor 112" and collectively as "the processors 112." The memories 116(1)-116(N) are also referred to herein individually as "the memory 116" and collectively as "the memories 116."

Each of the processors 112 can be any instruction execution system, apparatus, or device capable of executing instructions. For example, each of the processors 112 could comprise a central processing unit, a graphics processing unit, a controller, a micro-controller, a state machine, or any combination thereof. The memory 116 of each of the compute instances 110 stores content, such as software applications and data, for use by the processor 112 of the compute instance 110. In some alternate embodiments, each of any number of compute instances 110 can include any number of processors 112 and any number of memories 116 in any combination. In particular, any number of the compute instances 110 (including one) can provide a multiprocessing environment in any technically feasible fashion.

The memory 116 can be one or more of a readily available memory, such as random-access memory, read only memory, floppy disk, hard disk, or any other form of digital storage, local or remote. In some embodiments, a storage (not shown) can supplement or replace the memory 116. The storage can include any number and type of external memories that are accessible to the processor 112. For example, and without limitation, the storage can include a Secure Digital Card, an external Flash memory, a portable compact disc read-only memory, an optical storage device, a magnetic storage device, or any suitable combination of the foregoing.

As shown, in some embodiments, the computer instances 110(1)-110(N) are connected to input/output ("I/O") devices 104(1)-104(N), respectively. The I/O devices 104(1)-104(N) can include, without limitation, any number and/or types of devices configured to receive input, including, for example, a keyboard, a mouse, and so forth. The I/O devices 104(1)-104(N) can further include, without limitation, any number and/or types of devices configured to provide output, including, for example, a display device, a speaker, and so forth. The I/O devices 104(1)-104(N) can further include, without limitation, any number and/or types devices configured to both receive and provide input and output, respectively, including, for example, a touchscreen, a universal serial bus port, and so forth.

In some embodiments, each compute instance 110 can be integrated with any number and/or types of other devices (e.g., other compute instances 110, input devices, output devices, input/output devices, etc.) into a user device. Some examples of user devices include, without limitation, desktop computers, laptops, smartphones, smart televisions, game consoles, tablets, etc.

In general, each of the compute instances 110 is configured to implement one or more instances of one or more software applications. For explanatory purposes only, each instance of each software application is described as residing in the memory 116 of one of the compute instances 110 and executing on a processor 112 of the compute instance 110. In some embodiments, any number of instances of any number of software applications can reside in the memories 116 of any number of compute instances 110 and execute on the processors 112 of any number of compute instances 110 in any combination. In the same or other some embodiments, the functionality of any number of software applications can be distributed across any number of other software applications that reside in the memories 116 of any number of compute instances 110 and execute on the processors 112 of any number of compute instances 110 in any combination. Further, the functionality of any number of software applications can be consolidated into a single software application.

In particular, the compute instance 110(1) is configured to automatically obtain help for an associated user when the user encounters problems using any number and/or types of software applications. As described previously herein, some approaches to obtaining personalized guidance when using a software application involve automatically pairing a current software user with one or more other users who can help the current user with his/her specific question(s). However, conventional software is not configured to automatically account for the different experience levels that different users of a given software application may have with respect to specific features of the software applications or the different levels of domain-specific knowledge that different users of a given software application may have. If the user that is automatically identified to respond to a given help request lacks the experience with the associated features or the requisite domain-specific knowledge necessary to properly service the help request, then the likelihood of providing effective help and guidance to the current software user is substantially reduced.

Using Contextual Information to Target Specific Potential Helpers

To address the above problems, in some embodiments, the compute instances 110(1)-110(N) include, without limitation, mentor applications 140(1)-140(N), respectively. Each of the mentor applications 140(1)-140(N) is a different instance of a single software application. For explanatory purposes only, the mentor applications 140(1)-140(N) are also referred to herein individually as "the mentor application 140" and collectively as "the mentor applications 140."

Each of the mentor applications 140(1)-140(N) is associated with a different user. The users associated with mentor applications 140(1)-140(N) are also referred to herein individually as "an active user" and collectively as "active users." Each mentor application 140 can determine the other active users in any technically feasible fashion. For instance, in some embodiments, each mentor application 140 queries the mentor server 102 to determine the active users. In the same or other embodiments, the active users change over time and the techniques described herein are modified accordingly.

As described in greater detail below, the mentor application 140 enables the active users to request on-demand, one-on-one help from one another via help requests (not shown in FIG. 1). After an active user or "asker" submits a help request, the mentor application 140 computes match scores (not shown in FIG. 1) for each of the other active users based on the help request and any amount and/or type of relevant contextual information. Each match score is a predicted suitability of an associated active user for servicing an associated help request. For each help request, the mentor application 140 performs any number and/or type of operations to preferentially encourage active users having higher match scores to service the help request.

After one of the active users accepts a help request, thereby becoming a "helper" of the help request, the mentor application 140 automatically establishes a computer connection between the asker and the helper through which a help session 190 between the asker and the helper is held. In some embodiments, the mentor application 140 automatically records the help session 190. Note that FIG. 1 depicts a single instance of the help session 190. For explanatory purposes only, instances of the help session 190 are also referred to herein individually as "the help session 190" and collectively as "the help sessions 190." In some embodiments, any number of help sessions 190 can occur sequentially, concurrently, or in any combination thereof.

Advantageously, by preferentially encouraging active users having higher match scores for a given help request to respond to the help request, the mentor application 140 can increase the likelihood that the given help request is serviced by a user having the specific experience or domain-specific knowledge to effectively respond to the help request.

In some embodiments, the mentor applications 140(1)-140(N) communicate via the mentor server 102 and have access to the shared memory 120. The mentor server 102 can be any type of compute instance 110 that is configured to relay any type(s) of messages between the mentor applications 140. For instance, in some embodiments, the mentor server 102 is a WebSocket server. In some other embodiments, any amount of the functionality described herein with respect to the mentor application 140 can be implemented in the mentor server 120 as a central mentor application (not shown) instead of the mentor application 140. In such embodiments, the techniques described herein are modified accordingly.

The shared memory 120 can include, without limitation, any number and types of memories that are accessible the mentor applications 140(1)-140(N). In some embodiments, the shared memory 120 is cloud-based memory. Each mentor application 140 can write any amount and/or types of data to the shared memory 120 and read any amount and/or types of data from the shared memory 120. Accordingly, the mentor applications 140 can share any amount and/or types of data via the shared memory 120.

As shown, in some embodiments, the shared memory 120 includes, without limitation, an open request database 122, a shared folder 124, user contexts 126(1)-126(M), where M can be any integer greater than or equal to N, and a knowledge bank 128. The open request database 122 includes, without limitation, any number of instances of a help request dataset 160. For explanatory purposes only, instances of the help request dataset 160 are also referred to herein individually as "the help request dataset 160" and collectively as "the help request datasets 160." As described in greater detail below in conjunction with FIG. 2, each help request dataset 160 includes, without limitation, a help request and a ranked match list (not shown) that is associated with the help request. In some embodiments, the ranked match list includes, without limitation, any number of potential helper identifiers ("IDs") and the corresponding match scores for the help request in descending order according to match score. Each potential helper ID specifies a different active user.

As described in greater detail below in conjunction with FIG. 2, in some embodiments, the mentor application 140 stores any amount and/or types of captured media content (not shown in FIG. 1) that is associated with the help requests in the shared folder 124. In the same or other embodiments, the mentor application 140 stores any amount and/or types of data related to the help requests and/or the help sessions in the knowledge bank 128.

The user contexts 126(1)-126(M) are each associated with a different user, where N of the users are the active users and the remaining of the users are inactive users. For explanatory purposes only, the user contexts 126(1)-126(M) are also referred to herein individually as "the user context 126" and collectively as "the user contexts 126." Each user context 126 can include any amount and/or types of contextual data for the associated user. As described in greater detail below in conjunction with FIG. 2, in some embodiments, each user context 126 includes, without limitation, a command history, a user ID, a notification preference, skill level data, additional skill data, a help history, and an average help rating for the associated user.

As shown for the mentor application 140(1), in some embodiments, each mentor application 140 includes, without limitation, a command logging engine 142, a GUI engine 144, a help request engine 150, a help session engine 180, and an archive engine 146. The command logging engine 142 automatically logs any number and/or types of commands that the associated active user executes with respect to any number and/or types of software applications. The command logging engine 142 can log commands entered via a command-line interface as well as commands entered via a GUI. In some embodiments, the command logging engine 142 can log verbal commands.

The command logging engine 142 can implement any number and/or types of techniques to log commands. For instance, in some embodiments, the command logging engine 142 uses an accessibility application programming interface to track commands. In the same or other embodiments, the command logging engine 142 tracks when the associated active user clicks on different GUI elements in each of any number of software applications. The command logging engine 142 can use the GUI element names to map corresponding command names to more intuitive command names.

The command logging engine 142 can store the commands in any technically feasible fashion. For instance, in some embodiments, the command logging engine 142 stores the commands in a recent command history (not shown in FIG. 1).

Periodically, the command logging engine 142 updates the command history included in the user context 126 of the associated active user based on the recent command history. In some embodiments, the command logging engine 142 is omitted and the techniques described herein are modified accordingly.

The GUI engine 144 implements, without limitation, any amount and/or types of GUI functionality that is associated with any amount and/or types of contextual information the user contexts 126), help requests, help sessions 190, and the knowledge banks 128. For instance, in some embodiments, the GUI engine 144 enables the associated active user to open a setting view that displays the user context 126 for the associated active user and allows the associated active user to modify at least a portion of the user context 126. In the same or other embodiments, the GUI engine 144 provides any number and/or types of graphical elements that facilitate generating, submitting, viewing, browsing, accepting, and servicing help requests. In some embodiments, the GUI engine 144 provides any number and/or type of graphical elements for use in help sessions 190. In some embodiments, the GUI engine 144 enables the associated active user to open an open help request browser (not shown). In the same or other embodiments, the GUI engine 144 enables the associated active user to open a knowledge bank browser (not shown).

As described in greater detail below in conjunction with FIG. 2, the help request engine 150 generates and submits help requests in response to any amount and/or type of input from the associated active user. Each help request describes an issue experienced by the associated active user while using a software application. Each help request can describe the associated issue in any technically feasible fashion. In some embodiments, each help request includes, without limitation, a topic, a media content file name, an asker ID, an application ID that identifies the associated software application, and the recent command history of the asker.

In some embodiments, based on each help request and any amount and/or types of additional contextual information (e.g., the user contexts 126), the help request engine 150 generates the ranked match list for the help request. The ranked match list for a given help request specifies, without limitation, potential helpers and the match scores associated with the potential helpers for the help request. Initially, the potential helpers for a given help request are all of the active users except the asker. The ranked match list is in descending order according to match score, and the potential helper having the highest match score is also referred to herein as the "top match" for the help request.

In some embodiments, for each help request, the help request engine 150 generates the help request dataset 160 based on the help request and the associated ranked match list. In some embodiments, the help request dataset 160 for a given help request includes, without limitation, the help request and the associated ranked match list. After generating each help request dataset 160, the help request engine adds the help request dataset 160 to the open request database 122.

Subsequently, the help request engine 150 can perform any number and/or types of filtering operations on the ranked match list. For instance, in some embodiments, the help request engine 150 filters out any number of potential helpers based on the average help rating and/or the notification preference of the potential helpers.

In some embodiments, the help request engine 150 selectively targets potential helpers based on the ranked match list and encourages the targeted potential helpers to accept the help request until one of the potential helpers accepts the help request. The help request engine 150 can selectively target and encourage potential helpers in any technically feasible fashion. In some embodiments, until one of the potential helpers accepts the help request, the help request engine 150 iteratively targets one or more potential helpers based on the ranked match list and notifies the targeted potential helper(s) of the help request. In some embodiments, the help request engine 150 notifies potential helper(s) of the help request via instances of a help request notification 170 (not explicitly shown). For explanatory purposes only, instances of the help request notification 170 are also referred to herein as "the help request notification 170" and collectively as "the help request notifications 170."

More specifically, in some embodiments, until one of the potential helpers accepts the help request, the help request engine 150 iteratively generates and transmits help request notifications 170 that are staggered in time (e.g., at ten second intervals) to the potential helpers in descending order according to match score. In some embodiments, transmitting the help request notification 170 to the potential helper refers to configuring the mentor server 102 to relay the help request notification 170 to the mentor application 140 associated with the potential helper. Advantageously, in some embodiments, the help request engine 150 automatically and repeatedly sends help request notifications 170 to potential helpers until each help request is accepted.

In some embodiments, when the mentor application 140 receives the help request notification 170 for a given help request, the GUI engine 144 included in the mentor application 140 generates and displays an instance of an annotated help request 172 (not explicitly shown). For explanatory purposes only, instances of the annotated help request 172 are also referred to herein individually as "the annotated help request 172" and collectively as "the annotated help requests 172." Each of the annotated help requests 172 can be personalized for an associated active user based on the associated ranked match list.

As described in greater detail below in conjunction with FIG. 3, in some embodiments, each annotated help request 172 is a view that displays, without limitation, the topic, the asker ID, the application ID, captured media content, a playback toolbar (not shown in FIG. 1), a response selector (not shown in FIG. 1), and the match score for the associated help request and the associated potential user. If the associated potential user is the best match for the associated help request, then the annotated help request 172 also displays a best match annotation (not shown in FIG. 1). Advantageously, displaying the personalized match score and optionally the best match annotation encourages the active users who are best suited for servicing each help request to accept and respond to the help request.

In some embodiments, the GUI engine 144 allows the associated active user to browse the help requests that have not yet been accepted or "open help requests" via the open help request browser. For each help request dataset 160 included in the open request database 122 the GUI engine 144 generates and displays the annotated help request 172 that is personalized for the associated active user based on the help request and the ranked match list included in the help request dataset 160.

In some embodiments, the response selector enables the potential user to decline the help request, request a reminder of the help request, or accept the help request. If the potential user declines the help request, then the help request engine 150 filters out the potential user from the ranked match list. If, however, the potential user requests a reminder, then the GUI engine 144 redisplays the annotated help request 172 after a reminder interval (e.g., 10 seconds) if the associated help request has not yet been accepted. If the potential user accepts the help request, then the mentor application 140 associated with the potential user removes the associated help request dataset 160 from the open request database 122. The mentor application 140 associated with the potential user transmits, via the mentor server 102, a helper acceptance 178 to the mentor application 140 associated with the asker. In response to the helper acceptance 178 for the help request, the help request engine 150 associated with the asker ceases notifying potential helpers of the help request.

The help session engine 180 included in the mentor application 140 associated with the asker and the help session engine 180 included in the mentor application 140 associated with the helper collaborate to establish and record the help session 190 for the help request. For explanatory purposes only, instances of the help session engine 180 are also referred to herein individually as "the help session engine 180" and collectively as "the help session engine 180." The help session engines 180 can collaborate in any technically feasible fashion to establish the help session 190. The help session 190 can include, without limitation, any number and/or types of interactive sessions, shared software applications, shared screens, shared desktops, and GUI elements in any combination.

In some embodiments, to establish the help session 190, one of the help session engines 180 automatically establishes a computer connection between the asker and the helper through which the help session 190 between the asker and the helper is held. Through the computer connection, the help session engine 180 initiates a video conference call between the asker and the helper that is displayed in both an asker view 192 and a helper view 194. After both the asker and the helper have joined the video conference call, the help session engine 180 configures the video conference call to display and record webcam media content. The webcam video content enables the asker and the helper to share visual context and communicate via non-verbal cues, such as hand gestures. Through the computer connection, the help session engine 180 shares the screen of the asker with the helper to generate a shared screen 198. Accordingly, in some embodiments, the asker view 192 displays a software application GUI 130 of the software application associated with the help request, and the helper view 194 displays the software application GUI 130 as the shared screen 198. In the same or other embodiments, the asker can give control to the helper, allowing the helper to directly manipulate the software application GUI 130. In some embodiments, the help session engine 180 records the shared screen 198 as displayed and the commands executed during the help session 190. The shared screen 198 as displayed is also referred to herein as a "screen display."

The help session engine 180 displays a help session toolbar 196(1) in the asker view 192 and a help session toolbar 196(2) in the helper view 194. As described in greater detail below in conjunction with FIG. 4, in some embodiments, the help session toolbar 196(1) and the help session toolbar 196(2) each includes, without limitation, a title specifying the topic, any number of help session tools (not shown), and a countdown timer (not shown). The help session tools enable the asker and helper to control any number of aspects of the help session. In some embodiments, the help session tools enable basic annotation operations that enhance the shared context and can mimic in-person cues, such as pointing, that are difficult to perform remotely.

The countdown timer starts at a pre-determined duration time (e.g., three minutes) and counts down to zero. The help session engine 180 can use any number and/or types of visual effects to indicate when the remaining time is low. If the countdown timer reaches zero before either the asker or the helper ends the help session 190, then one of the help session engines 180 automatically ends the help session 190 and terminated the computer connection between the asker and the helper. Advantageously, limiting the length of each help session 190 encourages focused and efficient interactions that do not unnecessary burden the helper.

In some embodiments, after the help session 190 ends, the help session engine 180 in the mentor application 140 associated with the helper updates the help history included in the user context 126 of the helper to reflect the help session 190. In the same or other embodiments, the help session engine 180 requests that the asker rate the performance of the helper. The help session engine 180 updates the average help rating included in the user context 126 of the helper based on the help rating assigned by the asker.

In some embodiments, after each help session 190, the archive engine 146 automatically transcribes the speech associated with the recorded webcam media content. Based on the transcribed speech, the webcam media content, the recording of the shared screen 198, and the commands recorded during the help session 190, the archival engine 146 generates a clickable transcript (not shown). The clickable transcript enables navigation to relevant points in the recorded webcam media content and/or the recording of the shared screen 198 based on commands or utterance of interest.

The archival engine 146 stores the clickable transcript of the help session 190, the help request associated with the help session 190, and any amount and/or types of additional information in the knowledge bank 128. Some examples of additional information that the archival engine 146 can store in the knowledge bank 128 include, without limitation, the user ID (e.g., name) of the helper, the duration of the help session 190, and the rating of the help session. In some embodiments, the archive view enables the actives users to view and/or search any portion of the knowledge bank 128 in any technically feasible fashion.

In some embodiments, if the performance rating is unacceptably low, then the help session engine 180 interacts with the asker to determine whether the asker wants to resubmit the help request. If the help session engine 180 determines that the asker wants to resubmit the help request, then the help request engine 150 re-adds the help request dataset 160 to the open request database 122. The help request engine 150 filters out the helper from the ranked match list and then generates the help request notifications 170 for the resubmitted help request. The help request engine 150 can continue to resubmit the help request until the asker is satisfied with the performance of the most recent helper.

For explanatory purposes only, FIG. 1 depicts an exemplary sequence of events via numbered circles. Prior to the exemplary sequence of events, the mentor application 140(1) associated with the active user named Alice generates a help request (not shown) and a ranked mentor list. As per the ranked mentor list, the best match for the help request is the active user named Mike who is associated with the mentor application 140(N). The second best match for the help request is the active user named Bill that is associated with the mentor application 140(2).

As depicted via the circle numbered "1," the help request engine 150 included in the mentor application 140(1) adds the help request dataset 160 to the open request database 122. As depicted via the circles numbered "2," the help request engine 150 generates the help request notification 170(1) and transmits the help request notification 170(1) to the mentor application 140(N) associated with the best match (Mike) via the mentor server. For explanatory purposes only, Mike does not accept the help request before 10 seconds have elapsed.

Accordingly, as depicted via the circles numbered "3," the help request engine 150 included in the mentor application 140(1) generates the help request notification 170(2) and transmits the help request notification 170(2) to the mentor application 140(2) associated with the second best match (Bob) via the mentor server 102. As depicted via the circles numbered "4," Bob accepts the help request, and the mentor application 140(2) transmits the helper acceptance 178 to the help request engine 150 included in the mentor application 150(1) via the mentor server 140. As depicted via the circle numbered "5," the mentor application 140(2) updates the open request database 122 to reflect that the help request is no longer open.

As depicted via the circle number "6," the help session engines 180 establish a computer connection between the asker and the helper through with the help session 190 between the asker and the helper is held. As shown, the asker view 192 displays the video chat 188, the help session toolbar 196(1), and the software application GUI 130. The helper view 194 displays the video chat 188, the help session toolbar 196(2), and the shared screen 198 that is the software application GUI 130.

Note that the techniques described herein are illustrative rather than restrictive and can be altered without departing from the broader spirit and scope of the invention. Many modifications and variations on the functionality provided by the mentor application 140, the command logging engine 142, the GUI engine 144, the archive engine 146, the help request engine 150, the help session engine 180, the archive engine 146, and the mentor server 102 will be apparent to those of ordinary skill in the art without departing from the scope and spirit of the described embodiments.

It will be appreciated that the system 100 shown herein is illustrative and that variations and modifications are possible. For example, the functionality provided by the mentor application 140, the command logging engine 142, the GUI engine 144, the archive engine 146, the help request engine 150, the help session engine 180, the archive engine 146, and the mentor server 102 as described herein may be integrated into or distributed across any number of software applications (including one), and any number of components of the system 100. Further, the connection topology between the various units in FIG. 1 can be modified as desired.

Figure 2:
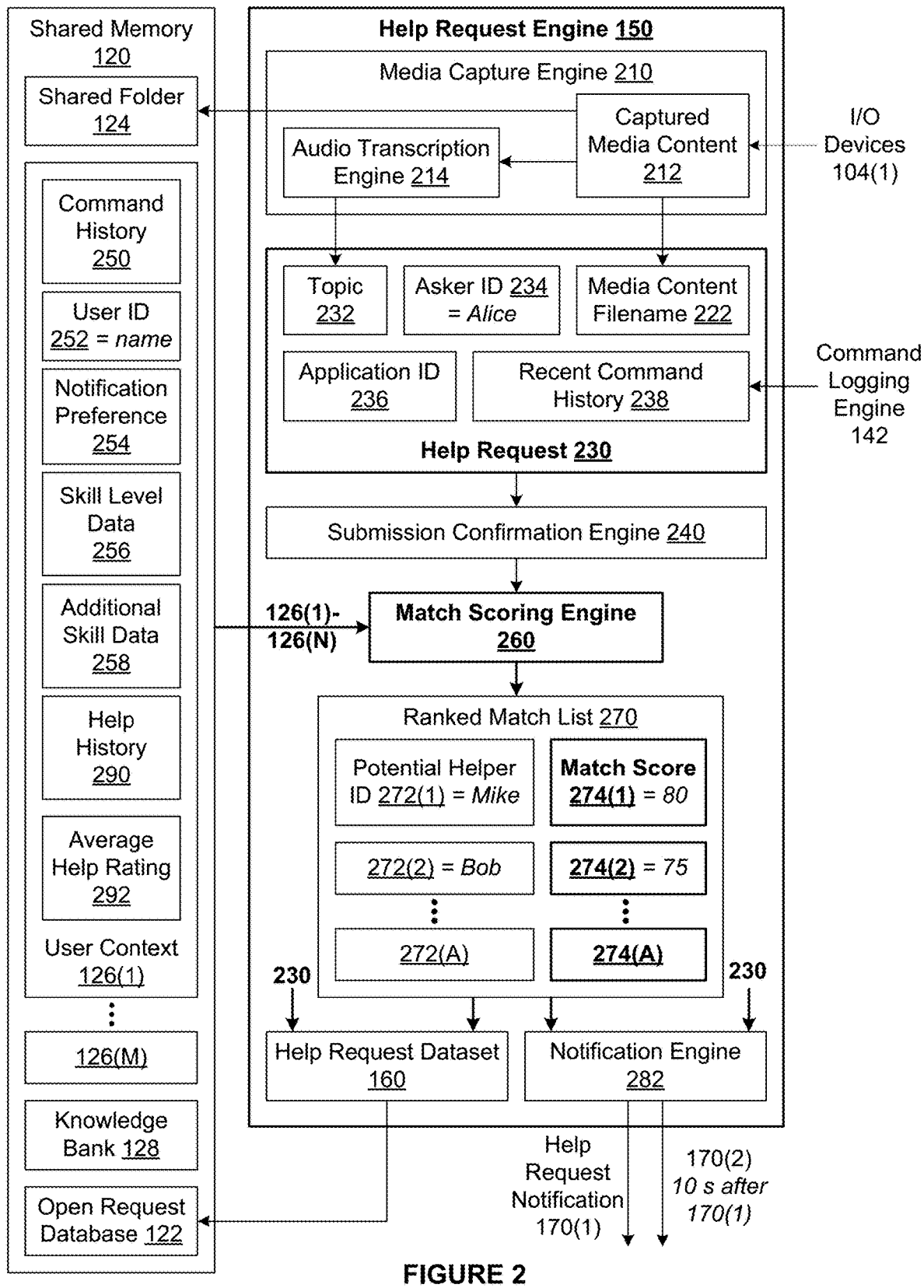
FIG. 2 is a more detailed illustration of the help request engine of FIG. 1, according to various embodiments.

FIG. 2 is a more detailed illustration of the help request engine 150 of FIG. 1, according to various embodiments. For explanatory purposes only, the functionality of the help request engine 150 depicted in FIG. 2 is described in the context of the exemplary embodiment described previously herein in conjunction with FIG. 1. Referring back to FIG. 2, the help request engine 150 is included in the mentor application 140(1). The help request engine 150 generates a help request 230. Based on the help request 230, the help request engine 150 adds the help request dataset 160 to the open request database 122. The help request engine 150 also transmits, via the mentor server 102, the help request notification 170(1) to the mentor applications 140(N). After a delay, the help request engine 150 transmits, via the mentor server 102, the help request notification 170(2) to the mentor applications 140(2).

In the same or other embodiments, at any given point in time, each of any number of the help request engine 150 can be associated with a different instance of the help request 230. For explanatory purposes only, instances of the help request 230 are also referred to herein individually as "the help request 230" and collectively as the "help requests 230." The help request engine 150 associated with each help request 230 generates the help request dataset 160 for the help request 230 and can transmit any number of help request notifications 170 to any of the mentor applications 140 in any order.

As shown, in some embodiments, the help request engine 150 includes, without limitation, a media capture engine 210, the help request 230, a submission confirmation engine 240, a match scoring engine 260, a notification engine 282, and the help request dataset 160. The media capture engine 210 includes, without limitation, captured media content 212 and an audio transcription engine 214. The captured media content 212 describes, at least in part, an issue that the active user associated with the mentor application 140(1) has encountered while using the software application GUI 130. The captured media content 212 can include, without limitation, any amount and/or types of image content, any amount and/or types of video content, any amount and/or types of audio content, or any combination thereof. The media capture engine 210 can generate any type of captured media content 212 based on user input received via any number and/or types of I/O devices 104(1) in any technically feasible fashion.

In some embodiments, the captured media content 212 includes, without limitation, video content and audio content. In the same or other embodiments, the media capture engine 210 generates the captured media content 212 in response to an activation of a help request recording mode via any number and/or types of GUI elements displayed by the GUI engine 144. When the help request recording mode is activated, the media capture engine 210 starts recording the screen display of the software application GUI 130 and audio input received via one or more microphones to generate the captured media content 212.

The media capture engine 210 can determine when to stop recording the screen and the audio input in any technically feasible fashion. For instance, in some embodiments, the media capture engine 210 stops recording the screen and the audio input when the help request recording mode is deactivated via any number and/or types of GUI elements displayed by the GUI engine 144. In the same or other embodiments, the media capture engine 210 automatically stops recording the screen and the audio input when the duration of the captured media content 212 exceeds a recording time limit (e.g., 16 seconds).

In some other embodiments, the captured media content 212 is a snapshot. In the same or other embodiments, the media capture engine 210 generates the captured media content 212 in response to a help request snapshot command received via any number and/or types of GUI elements displayed by the GUI engine 144. More specifically, upon receiving the help request snapshot command, the media capture engine 210 captures a snapshot of the screen display of the software application GUI 130 to generate the captured media content 212.

As shown, if the captured media content 212 includes audio content, then the audio transcription engine 214 transcribes the audio content to generate a topic 232. The topic 232 is a textual description of the issue described via the captured media content 212. The topic 232 is also referred to herein as "the textual topic." In some embodiments, the audio transcription engine 214 can execute any number and/or types of speech recognition algorithms to transcribe the audio content. In some other embodiments, the audio transcription engine 214 configures a speech recognition application (not shown) or cloud-based speech services to transcribe the audio content.

Although not shown, if the captured media content 212 does not include audio content (e.g., the captured media content 212 is a snapshot), then the media capture engine 210 generates the topic 232 based on textual user input. The media capture engine 210 can receive the textual user input in any technically feasible fashion. In some embodiments, the media capture engine 210 generates the captured media content 212 based on input received via a GUI element (e.g., a text entry box) displayed by the GUI engine 144.

In some embodiments, the help request engine 150 stores the captured media content 212 in the shared folder 124 based on a media content filename 222. In the same or other embodiments, the help request engine 150 generates the help request 230 that includes, without limitation, the media content filename 222, the topic 232, an asker ID 234, an application ID 236, and a recent command history 238. The active user associated with the mentor application 140(1) and therefore the help request 230 is also referred to herein as "the asker." The asker ID 234 is a user ID 252 of the asker. As depicted in italics, in some embodiments, each user ID 252 is a name of a different user, and the asker ID 234 is Alice.

The application ID 236 identifies the software application associated with the issue described in the topic 232. In the embodiment depicted in FIG. 1, the application ID 236 specifies the ID of the application associated with the software application GUI 130. The recent command history 238 includes, without limitation, any number (e.g., five) of the most recent commands executed by the active user associated with the mentor application 140(1). The recent command history 238 is generated by the command logging engine 142 described previously herein in conjunction with FIG. 1.

In some embodiments, the submission confirmation engine 240 configures the GUI engine 144 to display the help request 230 to the asker and prompt the asker to submit the help request 230. The GUI engine 144 can display the help request 230 and prompt the asker to submit the help request 230 in any technically feasible fashion. For instance, in some embodiments, the GUI engine 144 displays the help request 230 to the asker and prompts the asker to submit the help request 230 via a help submission window (not shown). The help submission window includes, without limitation, GUI elements that display the topic 232, enable the asker to playback the captured media content 212, and submit the help request 230. In some embodiments, if the asker does not submit the help request 230, then the help request engine 150 deletes the help request 230.

Predicting the Suitability of Potential Helpers for Servicing Help Requests

If the asker submits the help request 230, then the match scoring engine 260 generates the ranked match list 270 based on the user contexts 126 for all of the active users except the asker. In some embodiments, the ranked match list 270 includes, without limitation, potential helper IDs 272(1)-272(A), where A can be any integer this is less than N, and match scores 274(1)-274(A). For explanatory purposes only, the potential helper IDs 272(1)-272(A) are also referred to herein individually as "the potential helper ID 272" and collectively as "the potential helper IDs 272." The match scores 274(1)-274(A) are also referred to herein individually as "the match score 274" and collectively as "the match scores 274."

Each potential helper ID 272 is the user ID 252 of a different active user referred to herein as a "potential helper." The match scores 274(1)-274(A) predict the suitability of the active users associated with the potential helper IDs 272(1)-272(A), respectively, for servicing the help request 230. The potential helper IDs 272(1)-272(A) are in descending order according to match score 274 and therefore descending order according to predicted suitability for servicing the help request 230. The potential helper ID 272(1) corresponds to the potential helper that is the best match for the help request 230. The match scoring engine 260 can determine the potential helpers and the match scores 274 for the potential helpers in any technically feasible fashion.

In some embodiments, the match scoring engine 260 determines the potential helpers and the match scores 274 for the potential helpers based the help request 230, the user contexts 126, and any amount (including none) of additional contextual information associated with the help request 230. As described previously herein in conjunction with FIG. 1, each user context 126 is associated with a different user. Each user context 126 can include, without limitation, any amount and/or types of information that is relevant to determining the suitability of the associated user for servicing any type of help request 230 at any given point in time.

As shown, in some embodiments, each user context 126 includes, without limitation, a command history 250, the user ID 252, an notification preference 254, skill level data 256, additional skill data 258, a help history 290, and an average help rating 292 for the associated user. The command history 250 includes, without limitation, any number of commands executed by the associated user. The notification preference 254 specifies, without limitation, the availability of the associated user to receive help request notifications 170. For instance, in some embodiments, the notification preference 254 indicates that the user is available to receive help request notifications 170 for any of the help requests 230, none of the help requests 230, or help requests 230 for which the user is the best match.

The skill level data 256 specifies an overall skill level for each of any number of software applications. The additional skill data 258 can include, without limitation, any amount and/or types of information associated with additional skills, focus areas for specific software applications, and/or domain-specific knowledge. For each help session 190 that the user participated in as a helper, the help history 290 indicates the start time, the end time, and the asker. The average help rating 292 is an average of the help ratings assigned by askers after help sessions 190 that the user participated in as a helper.

The information in the user contexts 126 can be generated in any technically feasible fashion. In some embodiments, the command history 250 is generated by the command logging engine 142. In the same or other embodiments, the notification preference 254, the skill level data 256, and the additional skill data 258 are assigned by the GUI engine 144 in response to user input received via a settings window (not shown) displayed by the GUI engine 144. In some embodiments, the help history 290 and the average help rating 292 are generated by the help request engine 150. In some other embodiments, the help history 290 and the average help rating 292 are generated by the help session engine 180.

In some embodiments, the match scoring engine 260 initially determines that all of the active users except for the asker are potential helpers. The match scoring engine 260 can implement any number and type of algorithms (e.g., heuristics, rules, etc.) and/or execute any number and/or types of models (e.g., trained machine learning models) in any combination to compute the match scores 274 for the potential helpers. For instance, in some embodiments, the match scoring engine 260 sets the match score for each potential helper equal to a weighted sum of, without limitation, a command similarity factor, an experience similarity factor, an additional skill similarity factor, an additional skill relevance factor, a previous interaction factor, the amount of time since the potential helper was the helper in one of the help session 190, and the average help rating 292 of the potential helper.

In some embodiments, the match scoring engine 260 computes the command similarity factor based on the recent command history 238 of the asker and the command history 250 of the potential helper. More specifically, the match scoring engine 260 determines the command similarity factor based on the command frequencies with which the commands included in the recent command history 238 occur in the command history 250 of the potential helper. The command similarity factor increases as the command frequencies increase, thereby prioritizing potential helpers having the most experience with the commands included in the recent command history 238, In some embodiments, the match scoring engine 260 computes the skill similarity factor based on the skill level data 256 of the asker, the skill level data 256 of the potential helper, and the application ID 236. For the software application corresponding to the application ID 236, the match scoring engine 260 compares the skill level of the asker to the skill level of the potential helper. The skill similarity factor prioritizes potential helpers that are at least as experienced as the asker with the software application.

In the same or other embodiments, the match scoring engine 260 performs on one or more comparison operations between the additional skill data 258 of the asker and the additional skill data 258 of the potential helper to determine the additional skill similarity factor. The skill similarity factor correlates to a level of similarity between the additional skill data 258 of the asker and the additional skill data 258 of the potential helper. The additional skill similarity factor increases as the level of similarity increases, thereby prioritizing potential helpers having additional skills that are similar to the additional skills of the asker.

To determine the additional skill relevance factor, the match scoring engine 260 performs one or more comparison operations between the topic 232 and the additional skill data 258 of the potential helper to determine matches between additional skills, specific focus areas, and/or domain-specific knowledge. The additional skill relevance factor increases as the number of matches increase, thereby prioritizing potential helpers having additional skills, specific focus areas, and/or domain-specific knowledge that are mentioned in the topic 232.

The match scoring engine 260 determines the previous interaction factor based on the asker ID 234 and the help history 290 of the potential helper. The previous interaction factor increases as the number of help sessions 190 during which the potential helper assisted the asker increases, thereby prioritizing potential helpers with whom the asker is familiar.

The match scoring engine 260 determines the amount of time since the potential helper was the helper in a help session 190 based on the help history 290 of the potential helper. In some embodiments, including the amount of time since the potential helper was the helper in a help session in the weighted sum decreases the likelihood of overwhelming potential helpers who have recently responded to help requests 230. In the same or other embodiments, including the average help rating 292 of the potential helper in the weighted sum priorities potential helpers who have provided better assistance as per previous askers.

The match scoring engine 260 can perform, without limitation, any number and/or type of ranking operations to generate the ranked match list 270 based on the potential helper IDs 272 and the match scores 274. As shown, in some embodiments, the potential helper ID 272(1) corresponds to the potential helper that is the best match for the help request 230, and the ranked potential helper ID 272(A) corresponds to the potential helper that is the worse match for the help request 230.

As shown, the help request engine 150 generates the help request dataset 160 that includes, without limitation, the help request 230 and the ranked match list 270. The help request engine 150 then adds the help request dataset 160 to the open request database 122. In a complementary fashion, the notification engine 282 periodically and selectively encourages potential helpers to accept the help request 230 based on the ranked match list 270 until one of the potential helpers accepts the help request 230.

In some embodiments, prior to encouraging potential helpers, the notification engine 282 performs any number/or types of filtering operations on the ranked match list 270 based on any amount and/or types of contextual information. For instance, in some embodiments, the match scoring engine 260 filters out each potential helper that is associated with the average help rating 292 that is lower than a minimum acceptable help rating. In some embodiments, the match scoring engine 260 filters out each potential helper that is associated with the notification preference 254 of none. In the same or other embodiments, the notification engine 282 filters out each potential helper that is associated with the notification preference 254 of best match but is not the best match for the help request 230.

In the same or other embodiments, while encouraging potential helpers, the notification engine 282 can dynamically perform any number and/or types of filtering operations on the ranked match list 270 based on responses of the potential helpers to the help request 230. For instance, in some embodiments, if a given potential helper declines the help request 230 (e.g., via the response selector of the annotated help request 172), then the notification engine 282 filters out the potential helper.

The notification engine 282 can selectively encourage potential helpers in any technically feasible fashion based, at least in part, on the ranked match list 270. In some embodiments, until one of the potential helpers accepts the help request 230, the notification engine 282 iteratively generates and transmits help request notification(s) 170 that are staggered in time (e.g., at ten second intervals) to the potential helpers in descending order according to match score 274.

For instance, in the embodiment depicted in FIG. 2, the best match corresponds to the potential helper ID 272(1) of Mike and the match score 274(1) of 80. The second best match corresponds to the potential helper ID 272(2) of Ben and the match score 274(2) of 75. Accordingly, the notification engine 282 generates and transmits the help request notification 170(1) to Mike and waits ten seconds. Because none of the potential helps accept the help request 230, the notification engine 282 generates and transmits the help request notification 170(2) to Ben. Referring back now to FIG. 1, because Ben accepts the help request 230, the notification engine 282 receives the helper acceptance 178 and ceases to iterate.

Each help request notification 170 corresponds to one of the potential helpers and can be any type of message that indicates or specifies the help request 230 and any amount and/or type of other relevant information. For instance, in some embodiments, each help request notification 170 is a push notification. In the same or other embodiments, each help request notification 170 includes, without limitation, the help request 230, the match score 274 of the corresponding potential helper, and a best match flag. The best match flag indicates whether the corresponding potential helper is the best match.

The notification engine 282 can transmit each help request notification 170 to the associated potential helper in any technically feasible fashion. Referring back to FIG. 1, in some embodiments, the notification engine 282 configures the mentor server 102 to relay each help request notification 170 to the mentor application 140 associated with the corresponding potential user.

As described previously herein in conjunction with FIG. 1, in some embodiments, after the help session 190 associated with the help request 230 ends, the help session engine 180 acquires a help rating (not shown) for the helper from the asker. If the help rating is unacceptably low, then the help session engine 180 interacts with the asker to determine whether the asker wants to resubmit the help request 230.

If the help session engine 180 determines that the asker wants to resubmit the help request 230, then the help request engine 150 adds (again) the help request dataset 160 to the open request database 122. The notification engine 282 filters out the helper from the ranked match list 270 and then iteratively generates and transmits the help request notifications 170 starting with the best match until one of the potential helpers accepts the help request 230.

Figure 3:
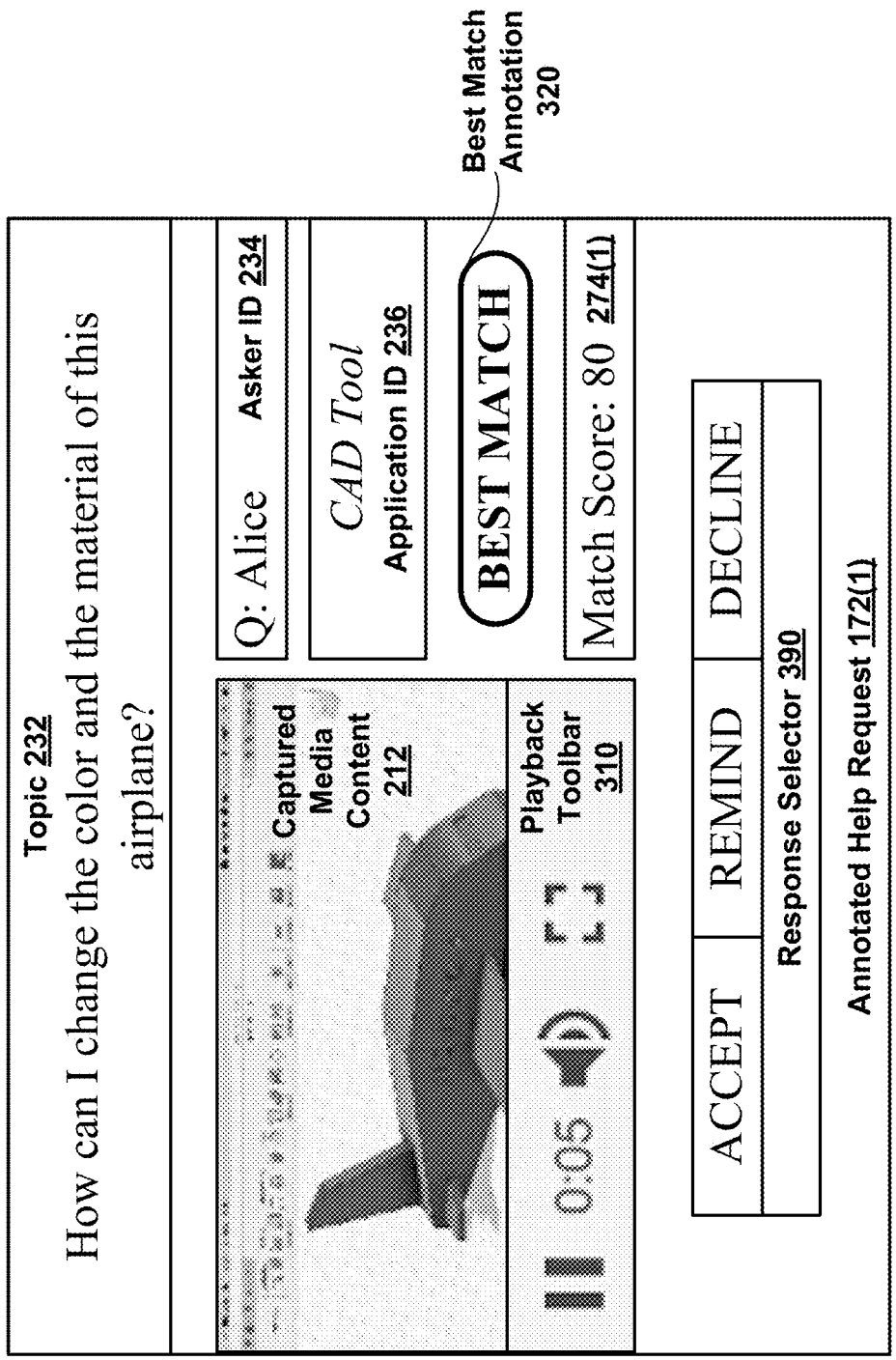
FIG. 3 is an exemplar illustration of one of the annotated help requests of FIG. 1, according to various embodiments.

FIG. 3 is an exemplar illustration of one of the annotated help requests 172 of FIG. 1, according to various embodiments. More specifically, FIG. 3 depicts an example of the annotated help request 172(1) associated with the best match for the help request 230. As shown, the annotated help request 172(1) displays, without limitation, the topic 232, the asker ID 234, the application ID 236, the captured media content 212, a playback toolbar 310, a response selector 390, the match score 274(1), and a best match annotation 320.

For explanatory purposes only, the topic 232 is "how can I change the color and material of this airplane," the asker ID 234 is "Alice," and the application ID 236 is "CAD tool." The captured media content 212 is a video of a plane, and the playback toolbar 310 provides controls for both the video and audio portions of the captured media content 212. The response selector 390 includes, without limitation, the selections of accept, remind, and notify. The match score 274(1) is 80 and, as indicated by the best match annotation 320, is the highest of the match scores 274.

Figure 4:
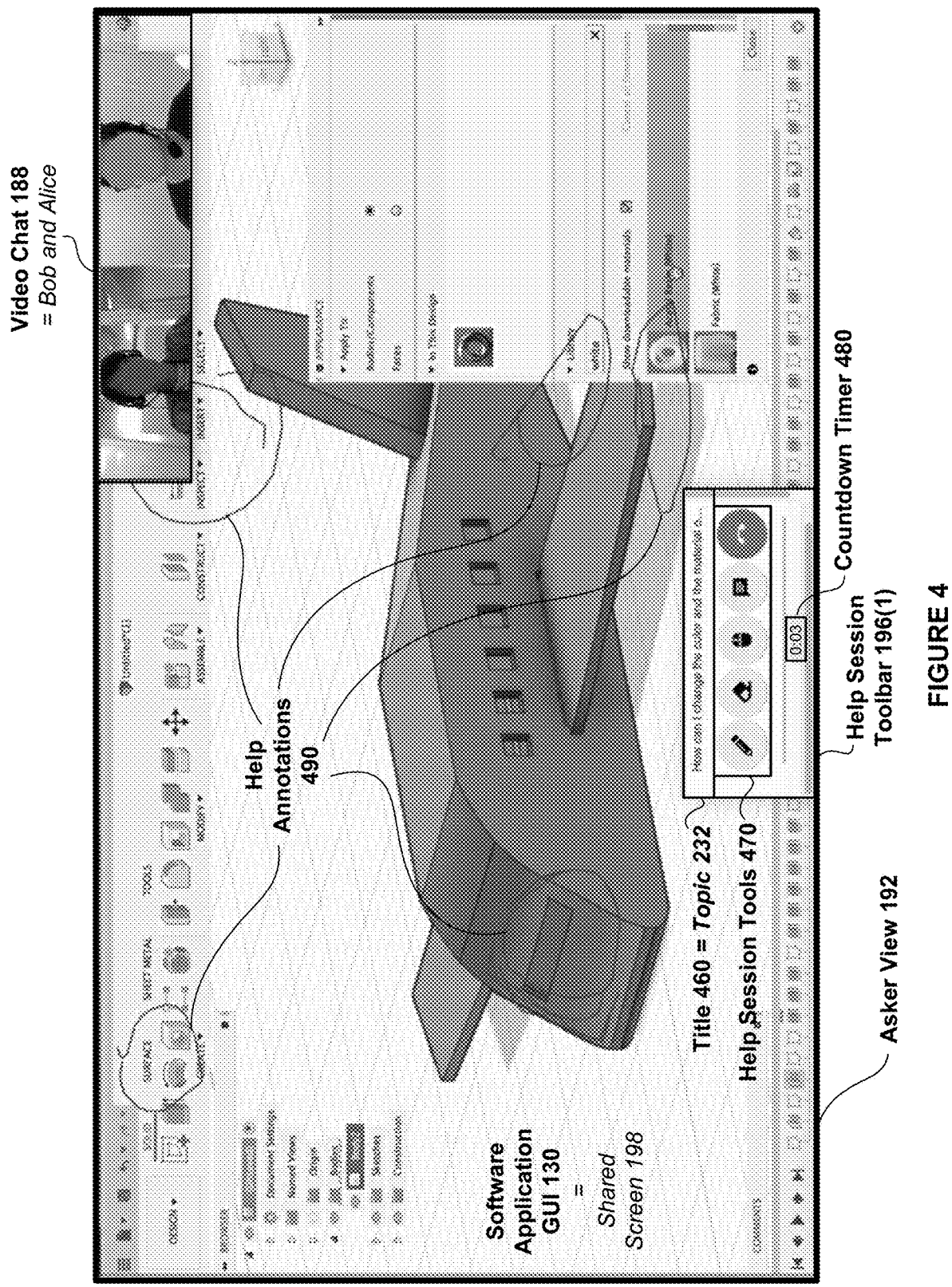
FIG. 4 is an exemplar illustration of the asker view of the help session of FIG. 1 viewed via the software application GUI of FIG. 1, according to various embodiments.

FIG. 4 is an exemplar illustration of the asker view 192 of the help session 190 of FIG. 1 viewed via the software application GUI 130 of FIG. 1, according to various embodiments. As shown, the asker view 192 includes, without limitation, the video chat 188 between the helper Bill and the asker Alice, the software application GUI 130 that is shared with the helper as the shared screen 198, the help session toolbar 196(1), and help annotations 490.

The help session toolbar 196(1) includes, without limitation, a title 460, a countdown timer 480, and help session tools 470. The title 460 displays the topic 232 of "how can I change the color and material of this airplane." The countdown 480 indicates that there is a maximum of three seconds left in the help session.

The help session tools 470 enable the asker to control any number of aspects of the help session 190. Notably, the help session tools 470 include an annotation tool. As shown, the help annotations 490 made by the helper via the annotation tool during the help session 190 indicate steps required to change the color of the displayed plane to white and the material to acetal resin.

Figure 5A:
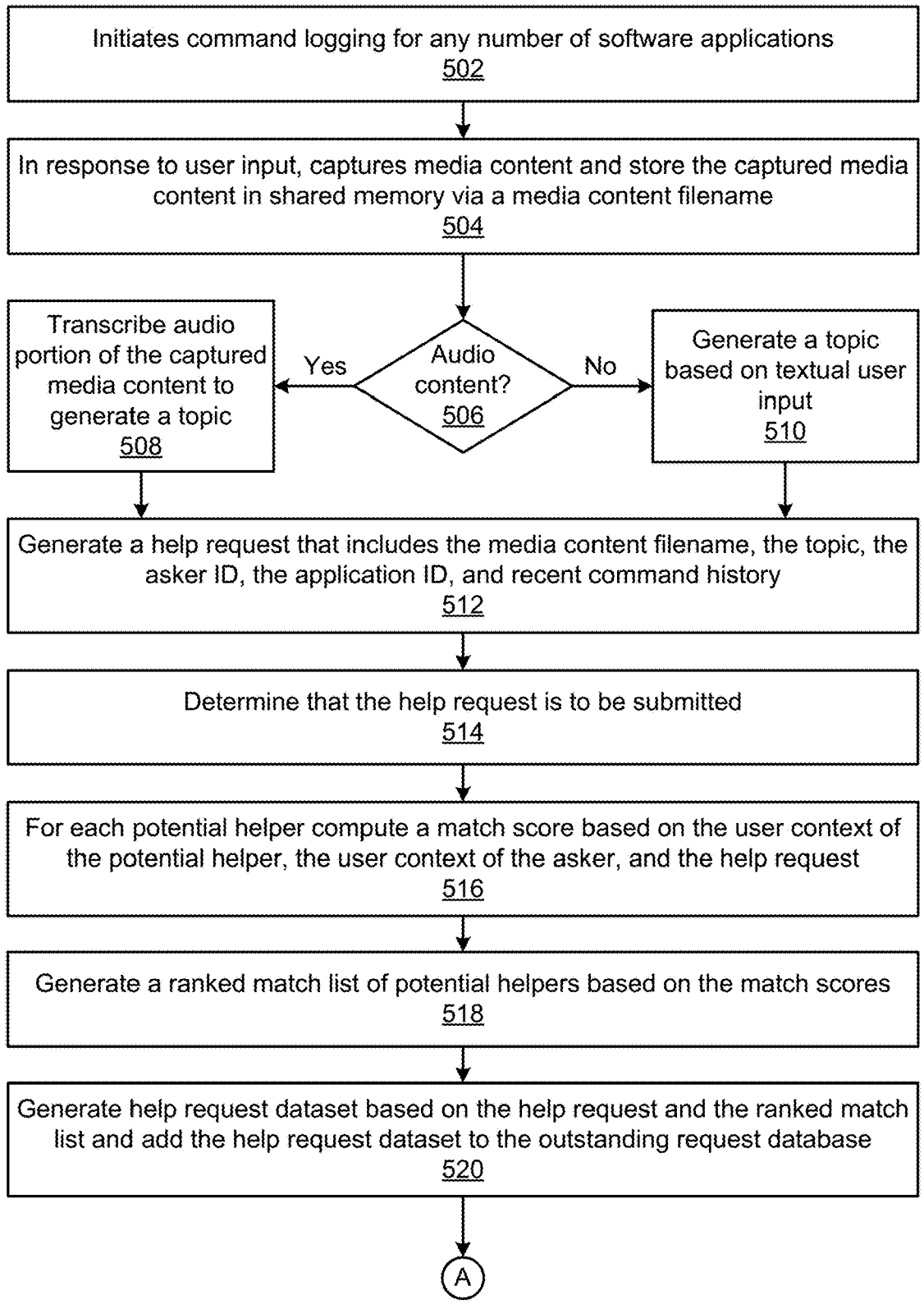
FIGS. 5A-5B set forth a flow diagram of method steps for automatically obtaining assistance with a software application, according to various embodiments.
Figure 5B:
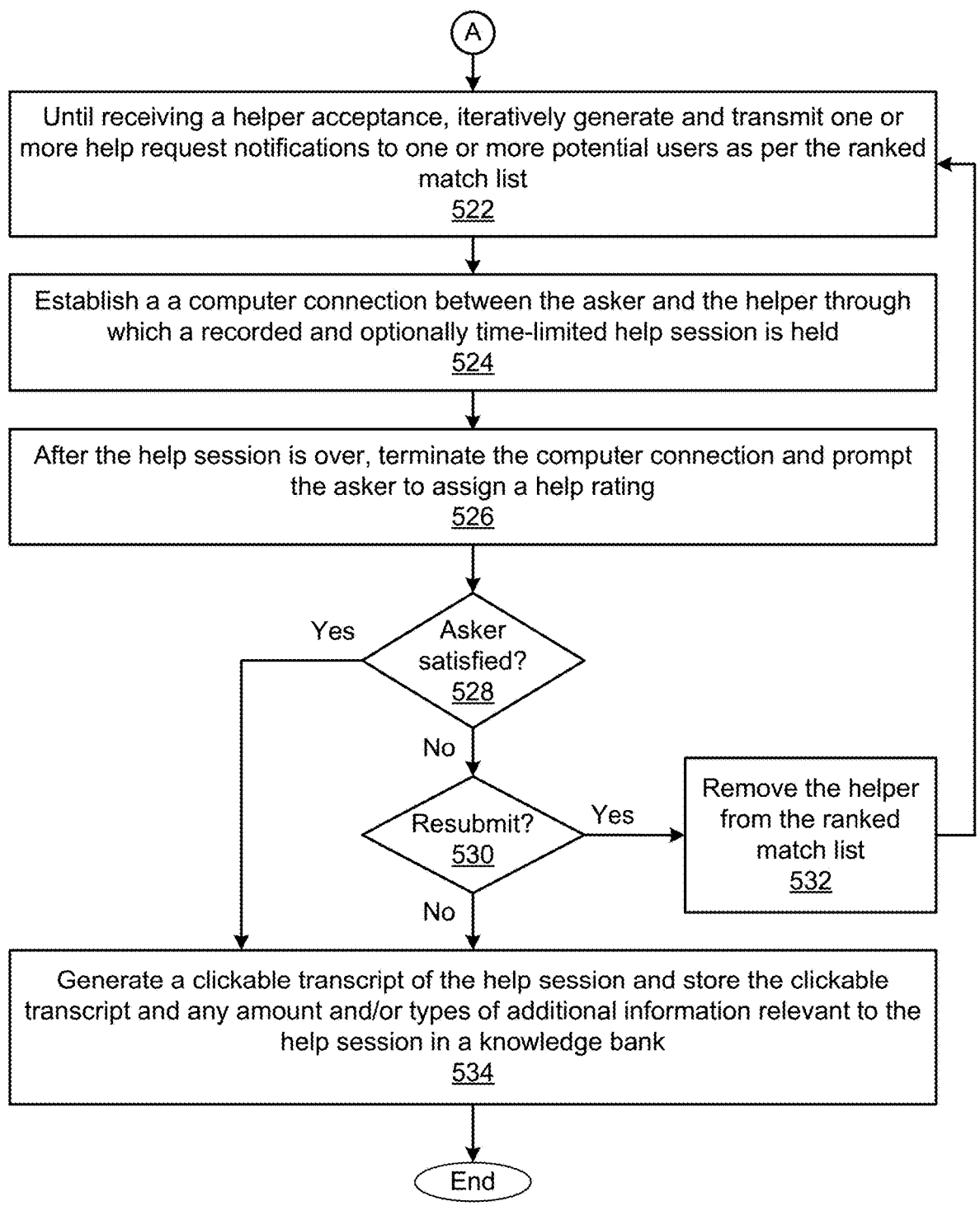

FIGS. 5A-5B set forth a flow diagram of method steps for automatically obtaining assistance with a software application, according to various embodiments. Although the method steps are described with reference to the systems of FIGS. 1-4, persons skilled in the art will understand that any system configured to implement the method steps, in any order, falls within the scope of the present invention.

As shown, a method 500 begins at step 502, where the command logging engine 142 initiates command logging for any number of software applications. At step 504, in response to user input, the media capture engine 210 captures any amount and/or type of media content and stores the captured media content 212 in the shared memory 120 via the media content filename 222. At step 506, the media capture engine 210 determines whether the captured media content 212 includes audio content.

If, at step 506, the media capture engine 210 determines that the captured media content 212 includes audio content, then the method 500 proceeds to step 508. At step 508, the audio transcription engine 214 transcribes the audio portion of the captured media content 212 to generate the topic 232. The method 500 then proceeds directly to step 512.

If, however, at step 506, the media capture engine 210 determines that the captured media content 212 does not include audio content, then the method 500 proceeds directly to step 510. At step 510, the media capture engine 210 generates the topic 232 based on textual user input.

At step 512, the help request engine 150 generates the help request 230 that includes, without limitation, the media content filename 222, the topic 232, the asker ID 234, the application ID 236, and the recent command history 238. At step 514, the submission confirmation engine 240 determines that the help request 230 is to be submitted.

At step 516, for each potential helper, the match scoring engine 260 computes the match score 274 based on the user context 126 of the potential helper, the user context 126 of the asker, and the help request 230. At step 518, the match scoring engine 260 generates the ranked match list 270 of potential helpers based on the match scores 274.

At step 520, the help request engine 150 generates the help request dataset 160 based on the help request 230 and the ranked match list 270 and then adds the help request dataset 160 to the open request database 122. At step 522, until receiving the helper acceptance 178, the help request engine 150 iteratively generates and transmits one or more of the help request notifications 170 to one or more potential users as per the ranked match list 270.

At step 524, the help session engine 180 establishes a computer connection between the asker and the helper through which the help session 190 between the asker and the helper is held. In some embodiments, the help session 190 is recorded and optionally time-limited. At step 526, after the help session 190 is over, the help request engine 150 terminates the computer connection between the asker and the helper and prompts the asker to assign a help rating to the helper. At step 528, the help session engine 180 determines whether the asker is satisfied. If, at step 528, the help session engine 180 determines that the asker is satisfied, then the method 500 proceeds directly to step 534.

If, however, at step 528, the help session engine 180 determines that the asker is not satisfied, then the method 500 proceeds to step 530. At step 530, the help session engine 180 determines whether the asker wants to resubmit the help request 230. If, at step 530, the help session engine 180 determines that the asker wants to resubmit the help request 230, then the method 500 proceeds to step 532. At step 532, the help request engine 150 removes the helper from the ranked match list 270 and the method 500 returns to step 522, where the help request engine 150 iteratively generates and transmits one or more of the help request notifications 170 as per the ranked match list 270.

If, however, at step 530, the help session engine 180 determines that the asker does not want to resubmit the help request 230, then the method 500 proceeds directly to step 534.

At step 534, the archive engine 146 generates a clickable transcript of the help session 190 and stores the clickable transcript and any amount and/or types of additional information relevant to the help session 190 in the knowledge bank 128. The method 500 then terminates.

In sum, the disclosed techniques can be used to efficiently obtain computer-based assistance for software applications. In some embodiments, each of multiple instances of a mentor application is associated with a different active user. The instances of the mentor application communicate via a mentor server and have access to shared memory. The shared memory includes, without limitation, an open request database, user contexts for each of the active users and any number of inactive users, a shared folder, and a knowledge bank. The open request database includes, without limitation, any number of help request datasets associated with any number of help requests that have not yet been accepted. Each user context includes, without limitation, any amount and/or types of data that is relevant to requesting and/or receiving help when using any number and/or types of software applications. The shared folder includes, without limitation, any amount and/or types of data associated with any number of help requests. The knowledge bank includes, without limitation, any amount and/or types of data associated with completed help sessions.

The mentor application includes, without limitation, a command logging engine, a GUI engine, a help request engine, a help session engine, and an archive engine. For each user, the command logging engine automatically logs commands that the user executes for any number of software applications in a recent command history. Periodically, each instance of the mentor application updates a command history included in the associated user context based on the recent command history for the associated active user. The GUI engine implements any amount and/or types of GUI functionality that enables each active user to display and modify the user context for the associated active user, request help, review, accept, and respond to open help requests, participate in an interactive help session with another active user, provide feedback regarding a help session, browse the knowledge bank, and so forth.

The help request engine captures media content describing an issue experienced by an associated user or "asker" while using a software application. More specifically, the help request engine records the screen display and audio input of the asker while the asker describes the issue visually and verbally to generate captured media content. The help request engine stores the captured media content in the shared memory via a media content filename. The help request engine transcribes the audio portion of the captured media content to generate a topic that is a textual description of the issue. Subsequently, the help request engine generates a help request that specifies, without limitation, the topic, the media content file name, an asker ID, an application ID, and the recent command history. The help request engine implements any amount and/or type of GUI functionality that enables the asker to view, update, and/or submit the help request.

After the asker submits the help request, the help request engine computes a match score for each of the remaining users or "potential helpers" based on the help request, the user context of the asker, and the user context of the potential helper. The match score of a given potential helper predicts how suitable the potential helper is for servicing the help request. The help request engine can compute the match score for a given potential helper for a given help request in any technically feasible fashion. For instance, in some embodiments, the help request engine sets the match score for a potential helper equal to a weighted sum of, without limitation, a command similarity factor, an experience similarity factor, an additional skill similarity factor, an additional skill relevance factor, a previous interaction factor, an amount of time since the potential helper was the helper in a previous help session, and an average help rating of the potential helper.

The help request engine ranks the potential helpers in descending order according to match score to generate a ranked match list associated with the help request. The help request engine then generates a help request dataset that includes, without limitation, the help request and the ranked match list. The help request engine adds the help request dataset to the open request database. Until one of the potential helpers accepts the help request, the help request engine iteratively generates and transmits, via the mentor server, push notifications that are staggered in time (e.g., at ten second intervals) to the potential helpers in descending order according to match score.

When a help request is accepted by a helper (e.g., one of the potential helpers), the associated mentor application transmits, via the mentor server, a helper acceptance to the method application associated with the asker and removes the help request dataset from the open request database 122. One of the help session engines then establishes a computer connection between the asker and the helper through which a recorded help session between the asker and the helper is held. To establish the help session, the help session engine initiates a video conference call between the asker and the helper, shares the screen of the asker with the helper, and displays a help session toolbar that is superimposed on the shared screen. The help session toolbar includes, without limitation, a title specifying the topic, any number of help session tools that control the help session and facilitate annotation of the shared screen, and a countdown timer. The countdown timer starts at a pre-determined duration time (e.g., three minutes) and counts down to zero. If the countdown timer reaches zero before either the asker or the helper ends the help session, then the help session engine automatically ends the help session and terminates the computer connection between the asker and the helper.

After the help session ends, the help session engine updates a help history included in the user context of the asker to reflect the completed help session. The help session engine requests that the asker rate the help provided by the helper and updates an average help rating included in the user context of the asker based on the help rating. The archive engine generates a clickable transcript based on the recording of the help session and stores the clickable transcript, the help rating, and any amount and/or type of additional information in the knowledge bank.

If the performance rating is unacceptably low, then the help request engine interacts with the asker to determine whether the asker wants to resubmit the help request. If the help request engine determines that the asker wants to resubmit the help request, then the help request engine adds (again) the help request dataset 160 to the open request database 122. The help request engine filters out the helper from the ranked match list and then generates the help request notifications 170 for the resubmitted help request. The help request engine can continue to resubmit the help request until the asker is satisfied with the performance of the most recent helper.

At least one technical advantage of the disclosed techniques relative to the prior art is that the disclosed techniques can be incorporated into a software application to enable the software application to automatically predict, based on contextual information, how suitable different users are for servicing a given help request for either that software application or an associated software application. Accordingly, with the disclosed techniques, the software application can automatically transmit help request notifications to users in descending order according to suitability for servicing the help request. This functionality, which is not available in conventional software applications, can increase the likelihood that a given help request is serviced by a user having the specific experience or domain-specific knowledge to effectively respond to the help request. These technical advantages provide one or more technological improvements over prior art approaches.

1. In some embodiments, a computer-implemented method for automatically obtaining assistance with software applications comprises generating a first computer-generated help request associated with a first user of a first software application, computing a first plurality of match scores based on the first computer-generated help request and a plurality of user contexts associated with a plurality of users, wherein each match score included in the first plurality of match scores predicts how suitable a particular user is for servicing the first computer-generated help request, based on the first plurality of match scores, transmitting at least one help request notification to at least one user included in the plurality of users to determine a second user to service the first computer-generated help request, and establishing a computer connection between the first user and the second user through which an interactive help session between the first user and the second user is held.

2. The computer-implemented method of clause 1, wherein a first user context included in the plurality of user contexts and associated with the first user comprises at least one of a command history, skill level data, additional skill data, help history, or an average help rating.

3. The computer-implemented method of clauses 1 or 2, wherein generating the first computer-generated help request comprises recording a first screen display associated with the first user and the first software application to generate a video, executing one or more speech recognition algorithms on an audio portion of the video to generate a textual topic, and aggregating at least the video and the textual topic to generate the computer-generated first help request.

4. The computer-implemented method of any of clauses 1-3, wherein computing the first plurality of match scores comprises computing at least one of a command similarity factor, an experience similarity factor, or an additional skill similarity factor based on a first user context included in the plurality of user contexts and associated with the first user and a second user context included in the plurality of user contexts and associated with the second user, and computing a match score that is associated with the second user based on the at least one of a command similarity factor, an experience similarity factor, or an additional skill similarity factor.

5. The computer-implemented method of any of clauses 1-4, further comprising generating a first help request notification that is transmitted to the second user based on the first computer-generated help request and a match score that is included in the first plurality of match scores and associated with the second user.

6. The computer-implemented method of any of clauses 1-5, wherein the interactive help session comprises a video conference call between the first user and the second user.

7. The computer-implemented method of any of clauses 1-6, further comprising superimposing a countdown timer on a screen that is shared by both the first user and the second user.

8. The computer-implemented method of any of clauses 1-7, further comprising determining that a pre-determined duration time for the interactive help session has elapsed and, in response, terminating the interactive help session.

9. The computer-implemented method of any of clauses 1-8, further comprising generating at least one recording of the interactive help session and generating a transcript of the at least one recording of the interactive help session.

10. The computer-implemented method of any of clauses 1-9, further comprising generating a second computer-generated help request associated with a third user of a second software application, computing a second plurality of match scores based on the second computer-generated help request and the plurality of user contexts, based on the second plurality of match scores, transmitting at least another help request notification to at least one user included in the plurality of users to determine that the first user is to service the second computer-generated help request, and establishing a second computer connection between the third user and the first user through which a second interactive help session between the third user and the first user is held.

11. In some embodiments, one or more non-transitory computer readable media include instructions that, when executed by one or more processors, cause the one or more processors to automatically obtain assistance with software applications by performing the steps of generating a first computer-generated help request associated with a first user of a first software application, computing a first plurality of match scores based on the first computer-generated help request and a plurality of user contexts associated with a plurality of users, wherein each match score included in the first plurality of match scores predicts how suitable a particular user is for servicing the first computer-generated help request, based on the first plurality of match scores, transmitting at least one help request notification to at least one user included in the plurality of users to determine a second user to service the first computer-generated help request, and establishing a computer connection between the first user and the second user through which an interactive help session between the first user and the second user is held.

12. The one or more non-transitory computer readable media of clause 11, wherein a first user context included in the plurality of user contexts and associated with the first user comprises at least one of a command history, skill level data, additional skill data, help history, or an average help rating.

13. The one or more non-transitory computer readable media of clauses 11 or 12, wherein generating the first computer-generated help request comprises capturing a snapshot of a first screen display associated with the first user and the first software application, determining a textual topic based on input received via a graphical user interface, and aggregating at least the snapshot and the textual topic to generate the first computer-generated help request.

14. The one or more non-transitory computer readable media of any of clauses 11-13, wherein computing the first plurality of match scores comprises performing one or more comparison operations between additional skill data included in a second user context included in the plurality of user contexts and associated with the second user and a textual topic associated with the first computer-generated help request to determine an additional skill relevance factor, and computing a match score that is associated with the second user based on the additional skill relevance factor and at least one of an average help rating included in the second user context, a command similarity factor, an experience similarity factor, or an additional skill similarity factor.

15. The one or more non-transitory computer readable media of any of clauses 11-14, further comprising determining that a first match score included in the first plurality of match scores and associated with the second user is greater than any other match score included in the first plurality of match scores, and indicating via a first help request notification that is transmitted to the second user that the second user is a best match for the first computer-generated help request.

16. The one or more non-transitory computer readable media of any of clauses 11-15, wherein the interactive help session comprises a video conference call between the first user and the second user.

17. The one or more non-transitory computer readable media of any of clauses 11-16, further comprising superimposing a countdown timer on a screen that is shared by both the first user and the second user.

18. The one or more non-transitory computer readable media of any of clauses 11-17, further comprising determining that a pre-determined duration time for the interactive help session has elapsed and, in response, terminating the interactive help session.

19. The one or more non-transitory computer readable media of any of clauses 11-18, further comprising generating at least one recording of the interactive help session and generating a transcript of the at least one recording of the interactive help session.

20. In some embodiments, a system comprises one or more memories storing instructions and one or more processors coupled to the one or more memories that, when executing the instructions, perform the steps of generating a computer-generated help request associated with a first user of a software application, computing a plurality of match scores based on the computer-generated help request and a plurality of user contexts associated with a plurality of users, wherein each match score included in the plurality of match scores predicts how suitable a particular user is for servicing the computer-generated help request, based on the plurality of match scores, transmitting at least one help request notification to at least one user included in the plurality of users to determine a second user to service the computer-generated help request, and establishing a computer connection between the first user and the second user through which an interactive help session between the first user and the second user is held.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. Aspects of the present embodiments can be embodied as a system, method, or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable media having computer readable program codec embodied thereon.

Any combination of one or more computer readable media can be utilized. Each computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory, a read-only memory, an erasable programmable read-only memory, a Flash memory, an optical fiber, a portable compact disc read-only memory, an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method for automatically obtaining assistance with software applications, the method comprising:
    generating a first computer-generated help request associated with a first function being performed by a first software application in response to one or more commands received from a first user;
    computing a first plurality of match scores based on the first computer-generated help request and a plurality of user contexts associated with a plurality of other users, wherein each of the match scores included in the first plurality of match scores predicts how suitable a respective other user included in the plurality of other users is for servicing the first computer-generated help request based on a respective level of experience or a respective level of skill the respective other user has with the first function being performed by the first software application;
    based on the first plurality of match scores, transmitting at least one help request notification to at least one other user included in the plurality of other users to determine a second user to service the first computer-generated help request; and
    establishing a computer connection between the first user and the second user through which an interactive help session between the first user and the second user is held.

2. The computer-implemented method of claim 1, wherein a first user context included in the plurality of user contexts and associated with the first user comprises at least one of a command history, skill level data, additional skill data, help history, or an average help rating.

3. The computer-implemented method of claim 1, wherein generating the first computer-generated help request comprises:
    recording a first screen display associated with the first user and the first software application to generate a video;
    executing one or more speech recognition algorithms on an audio portion of the video to generate a textual topic; and
    aggregating at least the video and the textual topic to generate the computer-generated first help request.

4. The computer-implemented method of claim 1, wherein computing the first plurality of match scores comprises:
    computing at least one of a command similarity factor, an experience similarity factor, or an additional skill similarity factor based on a first user context included in the plurality of user contexts and associated with the first user and a second user context included in the plurality of user contexts and associated with the second user; and
    computing a match score that is associated with the second user based on the at least one of a command similarity factor, an experience similarity factor, or an additional skill similarity factor.

5. The computer-implemented method of claim 1, further comprising generating a first help request notification that is transmitted to the second user based on the first computer-generated help request and a match score that is included in the first plurality of match scores and associated with the second user.

6. The computer-implemented method of claim 1, wherein the interactive help session comprises a video conference call between the first user and the second user.

7. The computer-implemented method of claim 6, further comprising superimposing a countdown timer on a screen that is shared by both the first user and the second user.

8. The computer-implemented method of claim 1, further comprising determining that a pre-determined duration time for the interactive help session has elapsed and, in response, terminating the interactive help session.

9. The computer-implemented method of claim 1, further comprising:
    generating at least one recording of the interactive help session; and
    generating a transcript of the at least one recording of the interactive help session.

10. The computer-implemented method of claim 1, further comprising:
    generating a second computer-generated help request associated with a third user of a second software application;
    computing a second plurality of match scores based on the second computer-generated help request and the plurality of user contexts;
    based on the second plurality of match scores, transmitting at least another help request notification to one or more other users included in the plurality of other users to determine that the first user is to service the second computer-generated help request; and establishing a second computer connection between the third user and the first user through which a second interactive help session between the third user and the first user is held.

11. One or more non-transitory computer readable media including instructions that, when executed by one or more processors, cause the one or more processors to automatically obtain assistance with software applications by performing the steps of:

generating a first computer-generated help request associated with a first function being performed by a first software application in response to one or more commands received from a first user;

computing a first plurality of match scores based on the first computer-generated help request and a plurality of user contexts associated with a plurality of other users, wherein each of the match scores included in the first plurality of match scores predicts how suitable a respective other user included in the plurality of other users is for servicing the first computer-generated help request based on a respective level of experience or a respective level of skill the respective other user has with the first function being performed by the first software application;

based on the first plurality of match scores, transmitting at least one help request notification to at least one other user included in the plurality of other users to determine a second user to service the first computer-generated help request; and establishing a computer connection between the first user and the second user through which an interactive help session between the first user and the second user is held.

12. The one or more non-transitory computer readable media of claim 11, wherein a first user context included in the plurality of user contexts and associated with the first user comprises at least one of a command history, skill level data, additional skill data, help history, or an average help rating.

13. The one or more non-transitory computer readable media of claim 11, wherein generating the first computer-generated help request comprises:

capturing a snapshot of a first screen display associated with the first user and the first software application;

determining a textual topic based on input received via a graphical user interface; and aggregating at least the snapshot and the textual topic to generate the first computer-generated help request.

14. The one or more non-transitory computer readable media of claim 11, wherein computing the first plurality of match scores comprises:

performing one or more comparison operations between additional skill data included in a second user context included in the plurality of user contexts and associated with the second user and a textual topic associated with the first computer-generated help request to determine an additional skill relevance factor; and computing a match score that is associated with the second user based on the additional skill relevance factor and at least one of an average help rating included in the second user context, a command similarity factor, an experience similarity factor, or an additional skill similarity factor.

15. The one or more non-transitory computer readable media of claim 11, further comprising:

determining that a first match score included in the first plurality of match scores and associated with the second user is greater than any other match score included in the first plurality of match scores; and indicating via a first help request notification that is transmitted to the second user that the second user is a best match for the first computer-generated help request.

16. The one or more non-transitory computer readable media of claim 11, wherein the interactive help session comprises a video conference call between the first user and the second user.

17. The one or more non-transitory computer readable media of claim 16, further comprising superimposing a countdown timer on a screen that is shared by both the first user and the second user.

18. The one or more non-transitory computer readable media of claim 11, further comprising determining that a pre-determined duration time for the interactive help session has elapsed and, in response, terminating the interactive help session.

19. The one or more non-transitory computer readable media of claim 11, further comprising:

generating at least one recording of the interactive help session; and generating a transcript of the at least one recording of the interactive help session.

20. A system comprising:

one or more memories storing instructions; and one or more processors coupled to the one or more memories that, when executing the instructions, perform the steps of:

generating a computer-generated help request associated with a first function being performed by a software application in response to one or more commands received from a first user;

computing a plurality of match scores based on the computer-generated help request and a plurality of user contexts associated with a plurality of other users, wherein each of the match scores included in the plurality of match scores predicts how suitable a respective other user included in the plurality of other users is for servicing the computer-generated help request based on a respective level of experience or a respective level of skill the respective other user has with the first function being performed by the first software application;

based on the plurality of match scores, transmitting at least one help request notification to at least one other user included in the plurality of other users to determine a second user to service the computer-generated help request; and establishing a computer connection between the first user and the second user through which an interactive help session between the first user and the second user is held.

* * * * *